United States Patent [19]

Iwatani et al.

[11] Patent Number: 4,910,451

[45] Date of Patent: Mar. 20, 1990

[54] VOLTAGE REGULATOR FOR GENERATOR OF AN AUTOMOBILE

[75] Inventors: Shiro Iwatani; Kenji Itoh, both of Himeji, Japan

[73] Assignee: Mitsubishi Denki Kabushiki Kaisha, Tokyo, Japan

[21] Appl. No.: 306,964

[22] Filed: Feb. 7, 1989

[30] Foreign Application Priority Data

Mar. 8, 1988 [JP] Japan .............................. 63-31375[U]

[51] Int. Cl.$^4$ ................................................ H02J 7/16
[52] U.S. Cl. ......................................... 322/28; 322/25; 361/20
[58] Field of Search ...................... 322/22, 24, 25, 27, 322/28, 72, 73; 361/20, 21, 54

[56] References Cited

U.S. PATENT DOCUMENTS

| | | | |
|---|---|---|---|
| 3,943,408 | 3/1976 | Jakobs et al. | 322/28 X |
| 4,310,792 | 1/1982 | Iwatani et al. | 322/28 |
| 4,658,200 | 4/1987 | Kouge | 322/28 X |

FOREIGN PATENT DOCUMENTS

| | | | |
|---|---|---|---|
| 2252108 | 4/1974 | Fed. Rep. of Germany | 322/25 |
| 0126135 | 10/1981 | Japan . | |
| 0577635 | 10/1977 | U.S.S.R. | 322/28 |
| 0595840 | 2/1978 | U.S.S.R. | 322/28 |
| 0624346 | 9/1978 | U.S.S.R. | 322/73 |
| 0826544 | 5/1981 | U.S.S.R. | 322/28 |
| 1402989 | 8/1975 | United Kingdom | 322/28 |

Primary Examiner—Patrick R. Salce
Assistant Examiner—Kristine Peckman
Attorney, Agent, or Firm—Sughrue, Mion, Zinn, Macpeak & Seas

[57] ABSTRACT

A voltage regulator circuit for an AC generator of an automobile is disclosed. The circuit comprises, in addition to the conventional elements, a transistor turned on and off in phase with the power transistor by the control transistor of the voltage detecting circuit. The collector of this additional transistor is coupled to the positive terminal of the battery through a resistor, while the emitter thereof is grounded. A serial circuit of a resistor and a capacitor forming a positive feedback circuit is coupled across the collector of this additional transistor and the base of the control transistor, a biasing resistor being coupled across the base and emitter of the control transistor. Thus, when the control transistor is turned on, the charging current of the capacitor produces a forward bias across the base and emitter of the control transistor; when the control transistor is turned off, the discharging current of the capacitor produces a reverse bias thereacross. A Zener diode is coupled across the collector and emitter of the additional transistor to limit the voltage thereacross under a predetermined level. Thus, the capacitor in the feedback circuit is protected from voltage surges.

4 Claims, 2 Drawing Sheets

VOLTAGE REGULATOR FOR GENERATOR OF AN AUTOMOBILE

BACKGROUND OF THE INVENTION

1. Field of the Invention

This invention relates to a voltage regulator circuit which, by interrupting the excitation current supplied to the field winding of a generator, regulates the output voltage of the generator to a predetermined level; more particularly, this invention relates to such a voltage regulator circuit for an AC generator, especially suited to be installed in an automobile, which comprises a positive feedback circuit, consisting of a serial RC circuit, for stabilizing the repeated interrupting operations of the power transistor of the voltage regulator circuit coupled in series with the field winding of the generator.

2. Description of the Prior Art

Automobiles are generally provided with an AC generator the output of which is rectified by a rectifier circuit and is regulated to a predetermined voltage level by a voltage regulator circuit. In such case, the voltage regulator circuit, which interrupts the excitation current supplied to the field winding of the generator when the output voltage exceeds the predetermined level. Generally comprises a positive feedback circuit coupled across the collector of the power transistor, i.e., the transistor coupled in series with the field winding of the generator for interrupting the excitation current supplied thereto, and the base of the control transistor in the voltage detector circuit controlling the power transistor.

FIG. 1 shows a conventional voltage regulator circuit for an AC generator of an automobile. The AC generator or alternator 1 comprises an armature winding 101 and a field winding 102. A full-wave rectifier circuit 2 coupled to the output terminals of the generator 1 is provided with a main and an auxiliary positive output terminal 201 and 202, and with a grounded negative output terminal 203. The voltage regulator circuit 3 has a well-known circuit structure: A voltage divider consisting of serially connected resistors 301 and 302 is coupled across the auxiliary and the negative terminal 202 and 203 of the rectifier circuit 2, the junction between resistors 301 and 302 being coupled to the base of a control transistor 304 through a Zener diode 303. The base of the power transistor 305 coupled in series with the field winding 102 is coupled, on the one hand, to the junction between the key switch 5 and an indicator lamp 6 through a resistor 306; the base of power transistor 305 is coupled, on the other hand, to the collector of control transistor 304 having a grounded emitter. Further, a resistor 311 for supplying initial excitation current from the battery 4 to the field winding 102 is coupled in parallel with the indicator lamp 6. A diode 307 for absorbing and suppressing the surge generated by the inductance of the field winding 102 upon interruption of the excitation current is coupled across the field winding 102. Further, a serial circuit of a positive feedback resistor 308 and a positive feedback capacitor 309 is coupled across the collector of the power transistor 305 and the base of the control transistor 304, a biasing resistor 310 being coupled across the base and emitter of control transistor 304 for producing a forward and a reverse bias thereacross.

The operation of the circuit of FIG. 1 is well known and roughly as follows: When the key switch 5 is closed to start the engine of the automobile, initial excitation current is supplied from the battery 4 to the field winding 102 through the parallel circuit of inidcator lamp 6 and resistor 311, thereby placing the generator 1 in condition for generating power. At the same time, the inidcator lamp 6 is energized to indicate that no voltage is delivered from the generator 1 yet. When the engine is started thereafter to rotate the field winding 102, AC voltages induced in the armature winding 101 are rectified by the rectifier 2 into a DC voltage. When the voltage at the positive output terminals 201 and 202 rises to the level of the battery voltage, the lamp 6 is extinguished to indicate that the generation of power has begun properly. Thereafter, the regulation of output voltage is effected as follows: When the output voltage at the auxiliary terminal 202 exceeds a predetermined level to raise the voltage at the junction between resistors 301 and 302 above the Zener voltage of the Zener diode 303, the Zener diode 303 becomes conductive in the reverse direction to turn on control transistor 304, thereby turning off power transistor 305. Conversely, when the output voltage at the auxiliary terminal 202 falls under the predetermined level, the Zener diode 303 again becomes non-conductive to turn off control transistor 304, thereby turning on power transistor 305. The output voltage of the AC generator is thus controlled to the predetermined level.

In the above described operation, the positive feedback circuit consisting of a resistor 308 and a capacitor 309 contributes to the stable interrupting operation of the power transistor 305 as follows:

When the power transistor 305 is turned off, the voltage at the collector thereof rises abruptly from a substantial ground level. Thus, the capacitor 309 begins to be charged through resistor 3008, and the current charging the capacitor 309 supplies the base current of the control transistor 304, thereby helping the control transistor 304 to stay in the conductive state until the current charging the capacitor 309 is diminished. On the other hand, when the output voltage of the rectifier circuit 2 falls under the predetermined level to turn off the Zener diode 303 and the control transistor 304, thereby turning on the power transistor 305, the collector voltage of the power transistor 305 falls abruptly almost to the ground level. Thus, the previously charged capacitor 309 begins to discharge through the serial circuit formed by the positive feedback resistor 308, power transistor 305, and the biasing resistor 310, thereby giving a reverse bias across the emitter and the base of control transistor 304. This reverse bias, which subsists until the capacitor 309 is substantially discharged, helps the control transistor 304 to stay in the non-conductive state. In the above described manner, in both operations of turning on and turning off of the power transistor 305, the positive feedback circuit consisting of the feedback resistor 308 and the feedback capacitor 309 produces a forward and a reverse bias across the base and emitter of the control transistor 304, and helps the control transistor 304 to stay turned on or turned off for a period of time, thereby realising the stable interrupting operation of the power transistor 305.

The voltage regulator circuit of FIG. 1, however, has the following disadvantage: Since the internal combustion engine of the automobile comprises an ignition system generating extremely high voltages, voltage surges, which may reach almost 300 volts, may arrive at the collector of the power transistor 305 in the non-conductive state. These voltage surges occurring when the power transistor 305 is turned off are applied across the capacitor 309 through the resistors 308 and 310. Thus, the positive feedback capacitor 309 is required to withstand a voltage in the range of of from 150 to 300 volts. Further, in the designing of the voltage regulator circuit, a due consideration must be payed for the voltage surges, which makes the designing of the circuit difficult.

SUMMARY OF THE INVENTION

It is the primary object of this invention therefore to provide a voltage regulator circuit for an AC generator, especially suited to be used in automobiles, which is capable of turning on and off the power transistor, which is coupled in series with the field winding of the generator, stably and reliably by means of a positive feedback circuit coupled to the base of the control transistor controlling the switching operation of the power transistor, while the withstanding voltage of the regulator circuit, especially that of the capacitor in the positive feedback circuit, can be reduced, thereby making the designing of the regulator circuit easier.

It is an additional object of this invention to provide such a voltage regulator circuit for an AC generator which is simple in structure and can be produced economically.

The above objects are accomplished in accordance with the principles of this invention in a voltage regulator circuit comprising, in addition to the conventional elements, a transistor turned on and off in phase with the power transistor which is coupled in series with the field winding for controlling the excitation current supplied thereto. The collector of this additional transistor turned on and off in phase with the power transistor by the control transistor of the voltage detecting circuit is coupled to a resistor, and the serial connection of the transistor and resistor thus formed is coupled across the output terminals of the rectifier circuit of the AC generator (or across the terminals of the battery coupled across the output terminals of the rectifier circuit of the generator), the emitter of this additional transistor being coupled to the output terminal of the rectifier circuit of the AC generator to which the emitter of the control transistor is coupled to, and the base of this additional transistor being coupled to the collector of the control transistor. (In a preferred embodiment, the emitters of the control transistor and the additional transistor are coupled to the grounded negative output terminal of the rectifier circuit of the generator, these transistors being NPN type junction transistors.) Thus, when the control transistor is turned on, this additional transistor is turned off simultaneously with the power transistor and a voltage equal in polarity to the forward base-emitter bias of the control transistor is produced at the collector of this additional transistor with respect to the emitter thereof; on the other hand, when the control transistor is turned off, this additional transistor is turned on simultaneously with the power transistor and the voltage at the collector thereof becomes substantially equal to the voltage at the emitter thereof, which is equal to the voltage at the emitter of the control transistor. A positive feedback circuit, including a serial connection of a resistor and a capacitor, is coupled across the collector of said additional transistor and the base of the control transistor, a biasing resistor being coupled across the base and emitter of the control transistor. Thus, when the control transistor is turned on, a forward base-emitter bias is produced by the charging current of the capacitor which flows in the positive feedback circuit and the biasing resistor due to the above mentioned voltage of equal polarity to the forward base-emitter bias of the control transistor produced at the collector of the additional transistor; on the other hand, when the control transistor is turned off, a reverse base-emitter bias is produced by the discharging current of the same capacitor. The switching operations of the control transistor therefore can be effected stably. Further, a Zener diode is coupled across the collector and emitter of said additional transistor, the forward direction of the Zener diode being opposite to the forward direction of the additional transistor across the collector and emitter thereof. This Zener diode shunts the voltage surges exceeding the Zener voltage thereof. Thus, the voltage regulator circuit, and in particular the capacitor in the positive feedback circuit, is exempted from the adverse effects of the voltage surges which are generated in the electrical system of the automobile having an ignition system for the engine.

BRIEF DESCRIPTION OF THE DRAWINGS

The novel features which are believed to be characteristic of this invention is set forth with particularity in the appended claims; this invention itself, however, both as to its organization and method of operation, may be best understood from the following detailed description of the preferred embodiments, taken in conjunction with the accompanying drawings, in which:

In the drawings, like reference numerals represent like or corresponding parts or portions.

DETAILED DESCRIPTION OF THE PREFERRED EMBODIMENTS

Figure 1:
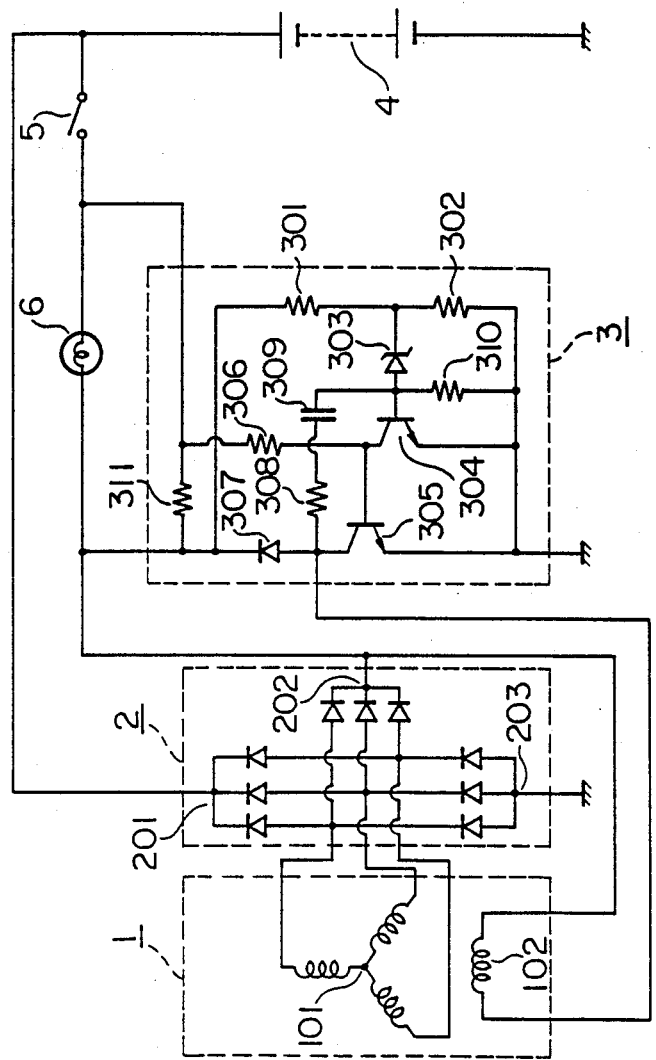
FIG. 1 is a circuit diagram of a conventional voltage regulator circuit for an AC generator which comprises a positive feedback circuit coupled across the collector of the power transistor and the base of the control transistor.
Figure 2:
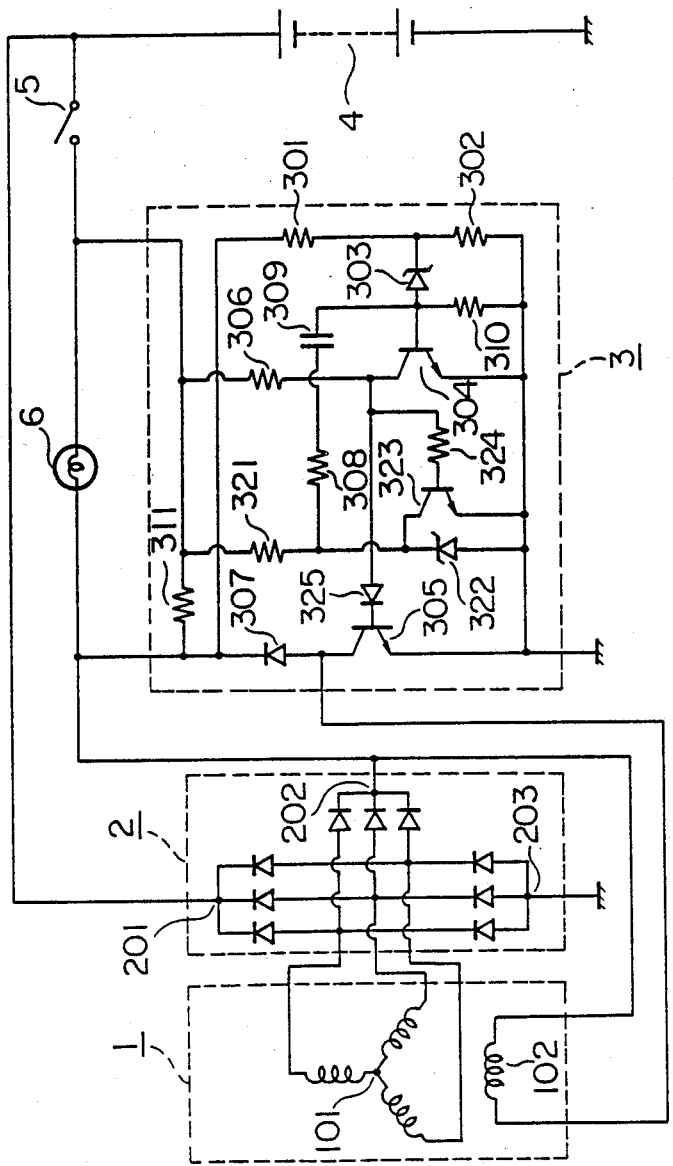
FIG. 2 is a circuit diagram of a voltage regulator circuit according to this invention, which comprises an additional transistor turned on and off in phase with the power transistor by the control transistor and having a Zener diode coupled across the collector and emitter thereof, the positive feedback circuit being coupled across the collector of the additional transistor and the base of the control transistor.

Referring now to FIG. 2 of the drawings, an embodiment according to this invention is described. The circuit of FIG. 2 is similar to that of FIG. 1, except for differences specifically described below. Thus, an AC generator 1 having an armature winding 101 and a field winding 102 is coupled, at the output terminals thereof, to a full-wave rectifier circuit 2 having a main and an auxiliary positive terminal 201 and 202 and a ground negative terminal 203. A battery 4 having a grounded terminal is coupled, at the postive terminal thereof, to the main positive terminal 201 of the rectifier circuit 2, on the one hand, and, on the other, to the auxiliary positive terminal 202 through a key switch 5 and an indicator lamp 6. As in the case of the circuit of FIG. 1, the voltage regulator circuit 3 comprises: a power transistor 305 coupled in series with the field winding 102; a diode 307 coupled across the field winding 102 for absorbing the surges generated upon interruption of a supply of the excitation current; a resistor 311 coupled in parallel with the indicator lamp 6 for supplying initial excitation current; a voltage divider consisting of a serial connection of resistors 301 and 302 coupled across the auxiliary terminal 202 and the ground; a serial connection of a resistor 306 and a control transistor 304 (having a collector coupled to the resistor 306) coupled across the junction point between the key switch 5 and the indicator lamp 6 and the ground; and a Zener diode 303 coupled across the junction between the resistors 301 and 302 and the base of control transistor 304, the forward direction thereof directed toward the junction between the resistors 301 and 302. Further, a biasing resistor 310 is coupled across the base and the emitter of the control transistor 304.

The voltage regulator circuit 3 of FIG. 2 according to this invention, however, is characterized by the fact that another transistor 323, turned on and off in phase with the power transistor and having a Zener diode coupled across the collector and emitter thereof, is provided in the circuit, the positive feedback circuit, i.e., a serial RC circuit, being coupled across the collector of the transistor 323 and the base of the control transistor 304. More specifically, a serial connection of a resistor 321 and a transistor 323 (having a collector coupled to the resistor 321) is coupled across the junction between the key switch 5 and the indicator lamp 6 and the ground, the base of the transistor 323 being coupled through a resistor 324 to the junction between the control transistor 304 and the resistor 306, i.e., to the collector of control transistor 304. Further, a Zener diode 322 is coupled across the emitter and the collector of the transistor 323, the forward direction of the Zener diode being directed toward the collector. On the other hand, the positive feedback circuit consisting of a serial connection of a resistor 308 and a capacitor 309 is coupled across the collector of transistor 323, i.e., the junction between the resistor 321 and the transistor 323, and the base of control transistor 304. Further, a diode 325 is inserted between the base of the power transistor 305 and the collector of control transistor 304 for matching the voltage therebetween, the forward direction of the diode 325 being directed toward the base of the power transistor 305.

the operations of the voltage regulator circuit of FIG. 1 are similar to that of the circuit of FIG. 2, except for the operations of the portion peculiar thereto. Thus, the description of the operations of the circuit of FIG. 2 which are identical to those of the circuit of FIG. 1 described above is not repeated here. On the other hand, the portions of the voltage regulator circuit of FIG. 2 which are characteristic of this invention is as follows:

Since the transistor 323 is supplied (through resistor 324) with the same base voltage as the power transistor 305, it is turned on and off in phase with the power transistor 305. Thus, when the control transistor 304 is turned on, the transistor 323 is turned off simultaneously with the power transistor 305. As a result, the voltage at the collector of transistor 323 rises abruptly. Namely, the voltage across the terminals of the battery 4 is applied across the serial circuit formed by the resistors 321 and 308, the capacitor 309, and the biasing resistor 310 (in parallel with the base-emitter of the control transistor 304), thereby biasing the base of the control transistor 304 with respect to the emitter thereof in the forward direction. The capacitor 309 begins to be charged and the voltage across the capacitor 309 gradually rises while the charging current flowing through the above specified serial circuit gradually diminishes with the lapse of time. (The speed of the rise of voltage across the capacitor 309, or the speed of the decline of the charging current, is determined by the time constant of the RC circuit formed by the above specified resistors and capacitor.) However, as long as a substantial charging current is flowing, the forward bias across the base and emitter of the control transistor 304 is maintained, even after the Zener diode 303 is turned off due to the falling output voltage across the rectifier circuit 2. The control transistor 304 is turned off when the diminishing charging current becomes incapable of sustaining the forward bias across the base and emitter of the control transistor 304. During the time in which the transistor 323 is turned off by the control transistor 304 in the conductive state, surge voltages not much less than 300 volts may be generated in the electrical system of the automobile comprising the voltage regulator circuit 3. The Zener diode 322, however, becomes conductive in the reverse direction when the voltage thereacross rises to or above 7 volts, for example, in that direction. Thus, the voltage across the collector and emitter of the transistor 323 is clamped, i.e., is limited under the Zener voltage of the Zener diode 322. Consequently, no surge voltages are applied across the feedback capacitor 309 in the serial circuit coupled across the collector and emitter of the transistor 323 turned on and off in phase with the power transistor 305. In the case where the Zener diode 322 has the above specified Zener voltage of 7 volts, the rated withstanding voltage of the feedback capacitor 309 may be about 10 volts, which makes the designing of the voltage regulator circuit 3 much easier.

When, on the other hand, the control transistor 304 is turned off due to the diminishing charging current supplied to the capacitor 309 as described above, the transistor 323 is turned on simultaneously with the power transistor 305 and the collector voltage of the transistor 323 falls abruptly substantially to the ground level. Thus, the capacitor 309, which was being charged during the time when the transistor 323 was turned off, begins to discharge through the serial circuit formed by feedback resistor 308, transistor 323, and biasing resistor 310, thereby giving a reverse bias across the emitter and the base of the control transistor 304. The voltage across the capacitor 309 and the amount of the discharging current falls gradually with the lapse of time. However, the control transistor 304 is maintained in the non-conductive state as long as a substantial discharging current continues to flow through the above specified serial circuit to keep the reverse bias across the base and emitter of the control transistor 304.

To sum up the operation of the voltage regulator circuit 3 as described above, the transistor 323 is turned on and off in phase with the power transistor 305; thus, the serial circuit formed by the resistor 321 and the transistor 323 coupled across the battery 4 produces a positive voltage at the collector of the transistor 323 (i.e., at the junction between the resistor 321 and the transistor 323) when the control transistor 304 is turned on; the same circuit produces a substantial ground level voltage at the collector of the transistor 323 when the control transistor 304 is turned off. The postive feedback circuit (i.e., the RC serial circuit consisting of resistor 308 and capacitor 309, coupled across the collector of transistor 323 and the base of control transistor 304) produces, together with the biasing resistor 310, a forward bias across the base and emitter of the control transistor 304 when the control transistor 304 is turned on, and a reverse bias across the base and emitter of the control transistor 323 when the control transistor 304 is turned off. Consequently, the switching operations of the control transistor 304, and hence those of the power transistor 305, can be stabilized. On the other hand, the Zener diode 322 shunts the current when the voltage across the collector and emitter of the transistor 323 rises above the Zener voltage thereof. Thus, the voltage across the positive feedback circuit is limited under a predetermined level.

While description has been made of a particular embodiment of this invention, it will be understood that many modifications may be made without departing from the spirit thereof. For example, although transistors of NPN type are used in the embodiment described above, those of PNP type can equally be used in their stead ith due modifications. The appended claims are contemplated to cover any such modifications as fall within the true spirit and scope of this invention.

What is claimed is:

1. A voltage regulator circuit for an AC generator including a field winding for forming a magnetic field and an armature winding in which AC voltages are induced by a magnetic field produced by the field winding, the AC voltages being rectified by a rectifier circuit into a DC voltage to be outputted from the rectifier circuit across output terminals thereof, said voltage regulator circuit comprising:

a power transistor coupled in series with a field winding of an AC generator and controlling a supply of excitation current to the field winding by being turned on and off;

a voltage divider including a serial connection of resistors coupled across output terminals of a rectifier circuit;

a serial connection of a resistor and a control transistor coupled across said output terminals of said rectifier circuit, an emitter and a collector of said control transistor being coupled to one of said output terminals of said rectifier circuit and a terminal of said resistor coupled in series therewith, respectively, and a base of said control transistor being coupled to a junction between the resistors of said voltage divider through a Zener diode having a forward direction opposite to a direction of a base current of said control transistor, wherein the collector of said control transistor is coupled to a base of said power transistor, said control transistor thereby controlling turning on and off of said power transistor;

a serial connection of a resistor and a third transistor coupled across said output terminals of said rectifier circuit, a collector of said third transistor being coupled to a terminal of said resistor in series therewith and an emitter of said third transistor being coupled to one of said output terminals of said rectifier circuit which is coupled to the emitter of said control transistor, wherein a base of said third transistor is coupled to the collector of said control transistor;

a second Zener diode coupled across the collector and emitter of said third transistor, a forward direction of said second Zener diode being directed opposite to a forward direction of said third transistor across the collector and emitter thereof;

a positive feedback circuit, including a serial connection of a resistor and a capacitor, coupled across the collector of said third transistor and the base of said control transistor; and a biasing resistor coupled across the base and emitter of said control transistor.

2. A voltage regulator circuit for an AC generator as claimed in claim 1, wherein one of said output terminals of said rectifier circuit to which the emitters of said control transistor and said third transistor are coupled is a grounded negative output terminal thereof, and said control transistor and third transistor are junction transistors of NPN type.

3. A voltage regulator circuit for an AC generator as claimed in claim 1 or 2, wherein a diode is inserted between the collector of said control transistor and the base of said power transistor, a forward direction of said diode being directed toward the base of said power transistor.

4. A voltage regulator circuit as claimed in claim 3, wherein the base of said third transistor is coupled to the collector of said control transistor through a resistor.

* * * * *